H. MOREY & S. H. BELLAH.
Sawing-Machines.

No. 146,839. Patented Jan. 27, 1874.

Witnesses.
Chas. Nida
C. Sedgwick

Inventor.
H. Morey
Per S. H. Bellah

Attorneys.

UNITED STATES PATENT OFFICE.

HARVEY MOREY AND SAMUEL H. BELLAH, OF CAMERON, TEXAS.

IMPROVEMENT IN SAWING-MACHINES.

Specification forming part of Letters Patent No. 146,839, dated January 27, 1874; application filed September 6, 1873.

*To all whom it may concern:*

Be it known that we, HARVEY MOREY and SAMUEL H. BELLAH, of Cameron, in the county of Milam and State of Texas, have invented a new and Improved Portable Sawing-Machine, of which the following is a specification:

The invention will first be fully described, and then pointed out in the claim.

Figure 1:
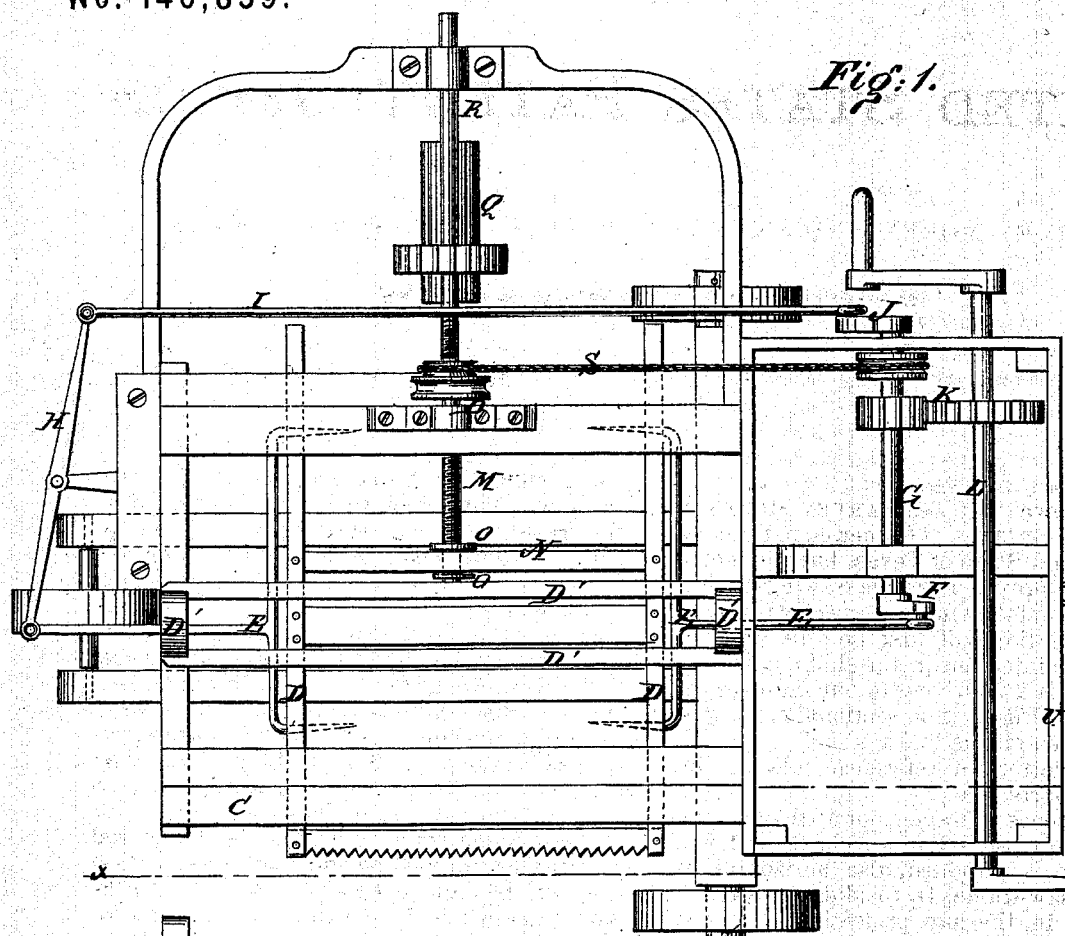
Figure 2:
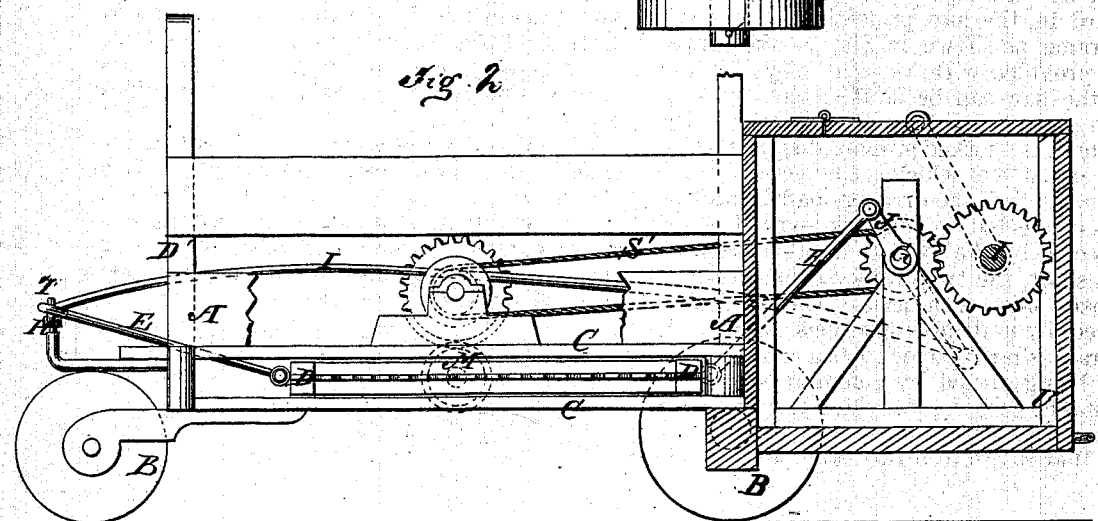

Figure 1 is a plan view of our improved machine; and Fig. 2 is a sectional elevation of Fig. 1, taken on the line $x\,x$.

Similar letters of reference indicate corresponding parts.

A represents a frame, mounted on a truck of, preferably, three low wheels, B, with which said frame is provided, also horizontal ways C, for a saw-frame, D, to slide forward and backward in, the saw projecting at one side of the frame, as shown in Fig. 1. Said frame is also provided with vertical ways D′, into which the saw can be shifted when it is desired to saw felled trees into blocks. This saw-frame has a forked pitman-rod, E, attached to each end, one of which is connected directly to the crank F of the driving-shaft G, and the other is connected to the rock-lever H, which is connected by the rod I to another crank, J, on said shaft, the two cranks being arranged at opposite sides of the axis. The crank-shaft is geared by multiplying wheels K with the hand crank-shaft L, which has a crank at each end for being turned by a man at each. The saw-frame has a feed-screw, M, fitted in a slotted bar, N, with a collar, O, at each side of said bar, so that it can feed the frame forward and back, while said frame reciprocates to work the saw. The screw works in a nut fixed on the frame at P, and gears by a long nut, Q, with a counter-shaft, R, and pinion, which is turned by the feed-belt S, working from the crank-shaft G.

When it is desired to arrange the saw vertically for cutting the felled trees up into blocks, the feed-screw and the rods E are disconnected, the saw-frame shifted up into the vertical ways D′, and again connected to rods E, suitably arranged for the saw in that position. The crank-shaft G and the point of connection, T, with the rock-lever H are arranged as high above the saw-frame when it lies in the horizontal position as can well be and work well, so that they will be high enough to work well with the saw-frame when it is arranged vertically for cutting off the felled trunks. To protect the driving-gear, we build a box, U, around it, and provide said box with a hinged cover to afford access.

Having thus described our invention, we claim as new and desire to secure by Letters Patent—

The combination of the two connecting-rods E, rock-lever H, and connecting-rod I with the said saw-frame and double-cranked shaft G, substantially as specified.

HARVEY MOREY.
SAMUEL H. BELLAH.

Witnesses:
JAMES B. MOORE,
THOS. W. BRODNAX.